(12) United States Patent
Fredriksson et al.

(10) Patent No.: US 9,212,941 B2
(45) Date of Patent: Dec. 15, 2015

(54) HIGH TEMPERATURE, HIGH PRESSURE (HTHP) RADAR LEVEL GAUGE

(71) Applicant: Rosemount Tank Radar AB, Goteborg (SE)

(72) Inventors: Hakan Fredriksson, Linkoping (SE); Magnus Ohlsson, Norsholm (SE)

(73) Assignee: Rosemount Tank Radar AB, Gothenburg (SE)

( * ) Notice: Subject to any disclaimer, the term of this patent is extended or adjusted under 35 U.S.C. 154(b) by 353 days.

(21) Appl. No.: 13/795,944

(22) Filed: Mar. 12, 2013

(65) Prior Publication Data

US 2014/0266862 A1 Sep. 18, 2014

(51) Int. Cl.
*G01F 23/284* (2006.01)
(52) U.S. Cl.
CPC .................................. *G01F 23/284* (2013.01)
(58) Field of Classification Search
CPC ............................... G01F 23/284; G01S 13/88
See application file for complete search history.

(56) References Cited

U.S. PATENT DOCUMENTS

| | | | | |
|---|---|---|---|---|
| 5,851,083 A * | 12/1998 | Palan | ........................... | 403/337 |
| 5,872,494 A | 2/1999 | Palan et al. | | |
| 6,011,400 A | 1/2000 | Nicolas | | |
| 6,097,346 A * | 8/2000 | Fehrenbach et al. | .......... | 343/785 |
| 6,800,241 B2 * | 10/2004 | Lopatin et al. | ................. | 264/642 |
| 6,847,214 B2 * | 1/2005 | Reimelt et al. | ................. | 324/644 |
| 7,255,002 B2 * | 8/2007 | Gravel et al. | ............... | 73/290 V |
| 7,401,511 B2 | 7/2008 | Dietmeier | | |
| 7,804,446 B2 | 9/2010 | Kienzle et al. | ................ | 324/124 |
| 8,196,465 B2 * | 6/2012 | Reimelt et al. | .............. | 73/290 V |
| 8,365,592 B2 * | 2/2013 | Osswald | ...................... | 73/290 R |
| 8,482,296 B2 * | 7/2013 | Reimelt et al. | ................ | 324/644 |
| 8,890,759 B2 * | 11/2014 | Pantea et al. | .................. | 343/783 |

(Continued)

FOREIGN PATENT DOCUMENTS

| | | |
|---|---|---|
| DE | 102012103493 A1 * | 10/2013 |
| EP | 2 490 040 A1 | 8/2012 |
| GB | 2 350 004 | 11/2000 |
| WO | WO 98/14762 | 4/1998 |
| WO | WO 2007/097690 | 8/2007 |

OTHER PUBLICATIONS

Notification of Transmittal of the International Search Report and the Written Opinion of the International Searching Authority from PCT/EP2014/054747, dated Jul. 10, 2014.

(Continued)

*Primary Examiner* — Matthew M Barker
(74) *Attorney, Agent, or Firm* — Westman, Champlin & Koehler, P.A.

(57) ABSTRACT

A radar level gauge using comprising a transceiver, processing circuitry, a signal propagating device, and a wave guide arrangement connecting the transceiver with the signal propagation device. The wave guide arrangement includes a hollow wave guide, a first filling member made of a first dielectric material, which first filling member is arranged inside the hollow wave guide, and a second filling member made of a second dielectric material, which second filling member is arranged inside the hollow wave guide outside the first filling member with respect to the tank. The second filling member is fixed in the wave guide at least in a direction out from the tank, and is configured to withstand temperatures up to 250 degrees Celsius.

During conditions of temperatures sufficiently high to soften the inner filling member, the outer filling member will thus serve to prevent the first filling member from being forced out of the wave guide.

36 Claims, 3 Drawing Sheets

(56) References Cited

U.S. PATENT DOCUMENTS

2001/0047685 A1   12/2001  Lubbers
2002/0124644 A1    9/2002  Lubbers .......................... 73/290
2007/0188396 A1*   8/2007  Griessbaum et al. ......... 343/786
2010/0109963 A1    5/2010  Kienzle et al.

OTHER PUBLICATIONS

Notification of Transmittal of the International Search Report and the Written Opinion of the International Searching Authority from PCT/EP2014/054744, dated Jun. 16, 2014.

* cited by examiner

HIGH TEMPERATURE, HIGH PRESSURE (HTHP) RADAR LEVEL GAUGE

FIELD OF THE INVENTION

The present invention relates to a radar level gauge having a transceiver for transmitting an electromagnetic transmit signal and receiving an electromagnetic echo signal, processing circuitry connected to the transceiver for determining the filling level based on the electromagnetic echo signal, a signal propagating device adapted to direct the electromagnetic transmit signal towards a surface of the product and to return a reflection from the surface as the electromagnetic echo signal, and a wave guide arrangement, connecting the transceiver with the signal propagation device.

BACKGROUND OF THE INVENTION

Radar level gauges (RLGs) are suitably used for making measurements of the level of products such as process fluids, granular compounds and other materials contained in a tank. An example of such a radar level gauge can include a transceiver for transmitting and receiving microwaves, a signal propagating device arranged to direct microwaves towards the surface and to return microwaves reflected by the surface to the transceiver, and processing circuitry adapted to determine the filling level based on a relation between microwaves transmitted and received by the transceiver.

The signal propagating device may be a directional antenna, adapted to emit free propagating electromagnetic waves into the tank and receive a reflection of those waves. Such an RLG is sometimes referred to as a non-contact RLG. The antenna may be adapted to a specific frequency band, and the currently most used frequency bands have center frequencies of around 6 GHz or 24 GHz.

In one conventional design the wave guide arrangement comprises a hollow wave guide which extends through the tank wall, which wave guide is filled with a dielectric filling member (plug) to prevent tank content from entering the wave guide. Sealing elements, such as o-rings or the like, are arranged around the plug to provide a process seal ensuring that the contents of the tank are not released into the outside environment. The process seal may be pressure tight.

The dielectric material in the filling member is selected to have suitable dielectric properties, and is also preferably hydrophobic, i.e. repelling to water. However, such materials, e.g. PTFE, are typically also relatively soft, and affected by elevated temperatures. Under conditions of varying temperatures, a soft dielectric filling member, such as a PTFE filling member, may therefore move in relation to the surrounding wave guide, which is typically made of steel. Such movement may cause the sealing provided by the sealing elements to be degraded, leading to imperfect tank sealing.

Further, during conditions of high temperature and high pressure (HTHP) in the tank, there is also a risk that a soft dielectric member, will be forced out of the wave guide, also through a relatively small opening (i.e. much smaller than the diameter of the dielectric member).

GENERAL DISCLOSURE OF THE INVENTION

It is an object of the present invention to mitigate these problems and provide a radar level gauge with improved sealing of the feed through structure, and reduced risk of signal transmission deterioration.

According to a first aspect of the invention, this object is achieved by a radar level gauge using electromagnetic waves for determining a filling level of a product in a tank, the radar level gauge comprising a transceiver for transmitting an electromagnetic transmit signal and receiving an electromagnetic echo signal, processing circuitry connected to the transceiver for determining the filling level based on the electromagnetic echo signal, a signal propagating device adapted to direct the electromagnetic transmit signal towards a surface of the product and to return a reflection from the surface as the electromagnetic echo signal, and a wave guide arrangement, connecting the transceiver with the signal propagation device. The wave guide arrangement includes a hollow wave guide, a first filling member made of a first dielectric material, which first filling member is arranged inside the hollow wave guide, and a second filling member made of a second dielectric material, which second filling member is arranged inside the hollow wave guide outside the first filling member with respect to the tank, wherein the second filling member is fixed in the wave guide at least in a direction out from the tank. Further, the second dielectric material is configured to withstand temperatures up to 250 degrees Celsius.

By dividing the dielectric filling member into (at least) two portions, the outer portion may be made of a structurally strong and temperature resistant material, which can be fastened in the wave guide, and thus hold the inner portion in place, also when this lower portion is softened by elevated temperatures. During conditions of temperatures sufficiently high to soften the inner filling member, the outer filling member will thus serve to prevent the first filling member from being forced out of the wave guide.

It is noted that in the following disclosure and claims, the expressions "inner" and "outer" are used to indicate relative position with respect to the tank interior. The outer filling member is thus located further away from the tank interior than the inner filling member.

In order to be fixed in the wave guide, the outer filling member needs to be structurally strong and form stable. The expression "withstand temperatures" is intended to mean that the outer filling member will not loose its form stability, nor melt or deteriorate chemically. In brief, the outer filling member will act as a "plug" also at elevated temperatures.

The second dielectric material can preferably withstand even higher temperatures, e.g. up to 500 degrees Celsius. The outer filling member may suitably be made of a ceramic material, such as aluminum oxide, of an epoxy resin, or of glass.

The inner filling member is made of a dielectric material having suitable electromagnetic properties, as well as being resistant to the content in the tank, typically petroleum products. In addition to these properties, the inner filling member preferably is hydrophobic, i.e. repels water. Examples of materials conventionally used as dielectric filling members in radar level gauges include PTFE, PFA, FEP and PPS.

According to a second aspect of the invention, this object is achieved by a radar level gauge using electromagnetic waves for determining a filling level of a product in a tank, the radar level gauge comprising a transceiver for transmitting an electromagnetic transmit signal and receiving an electromagnetic echo signal, processing circuitry connected to the transceiver for determining the filling level based on the electromagnetic echo signal, a signal propagating device adapted to direct the electromagnetic transmit signal towards a surface of the product and to return a reflection from the surface as the electromagnetic echo signal, and a wave guide arrangement, connecting the transceiver with the signal propagation device. The wave guide arrangement includes a hollow wave guide, comprising an inner portion formed by a first electrically conducting wave guide forming member, and an outer portion formed by a second electrically conducting wave guide forming member, a first dielectric wave guide filling member, having an elongated center portion with an inner end received in the inner wave guide portion and an outer end received in the outer wave guide portion, and a cup-shaped sleeve portion extending radially outwards from the center portion and axially along the center portion, the sleeve thus forming a cup-shape with an opening facing away from the tank, at least part of the sleeve portion being sandwiched between the first and second wave guide forming members.

With this design of the dielectric filling member, any leakage of water or tank content that reaches the dielectric member will be guided by the outside of the cup-shaped sleeve and can be ventilated out of the gauge to prevent it from reaching the circuitry.

For this purpose, the wave guide arrangement may comprise at least one channel providing fluid contact between an outer rim of the cup-shaped sleeve to an exterior of the tank and through the channel(s) to the exterior of the tank.

The wave guide arrangement may further comprise at least one sealing element in contact with the cup-shaped sleeve and adapted to provide a process seal of said tank. At least in places where the sealing element(s) is/are in contact with the sleeve, the sleeve then preferably has a material thickness which is significantly less than the diameter of the central portion. This improves the sealing function of the sealing elements, as the thin wall will be less affected by varying temperatures.

In combination with the first aspect of the invention, the cup-shaped sleeve is particularly advantageous. As discussed above, the first aspect of the invention provides two separate wave guide filling members. While this solution addresses the problem of a soft dielectric filling member being forced out of the wave guide, it introduces another problem. If the sealing of the wave guide is imperfect, any leakage (e.g. water or tank content) may reach an interface surface between separate dielectric filling members. A layer of e.g. water on such an interface may significantly impair the transmission of electromagnetic signals through the wave guide. The cup-shaped sleeve of the second aspect of the invention will ensure that any leakage is prevented from reaching the interface between the first and second filling members.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
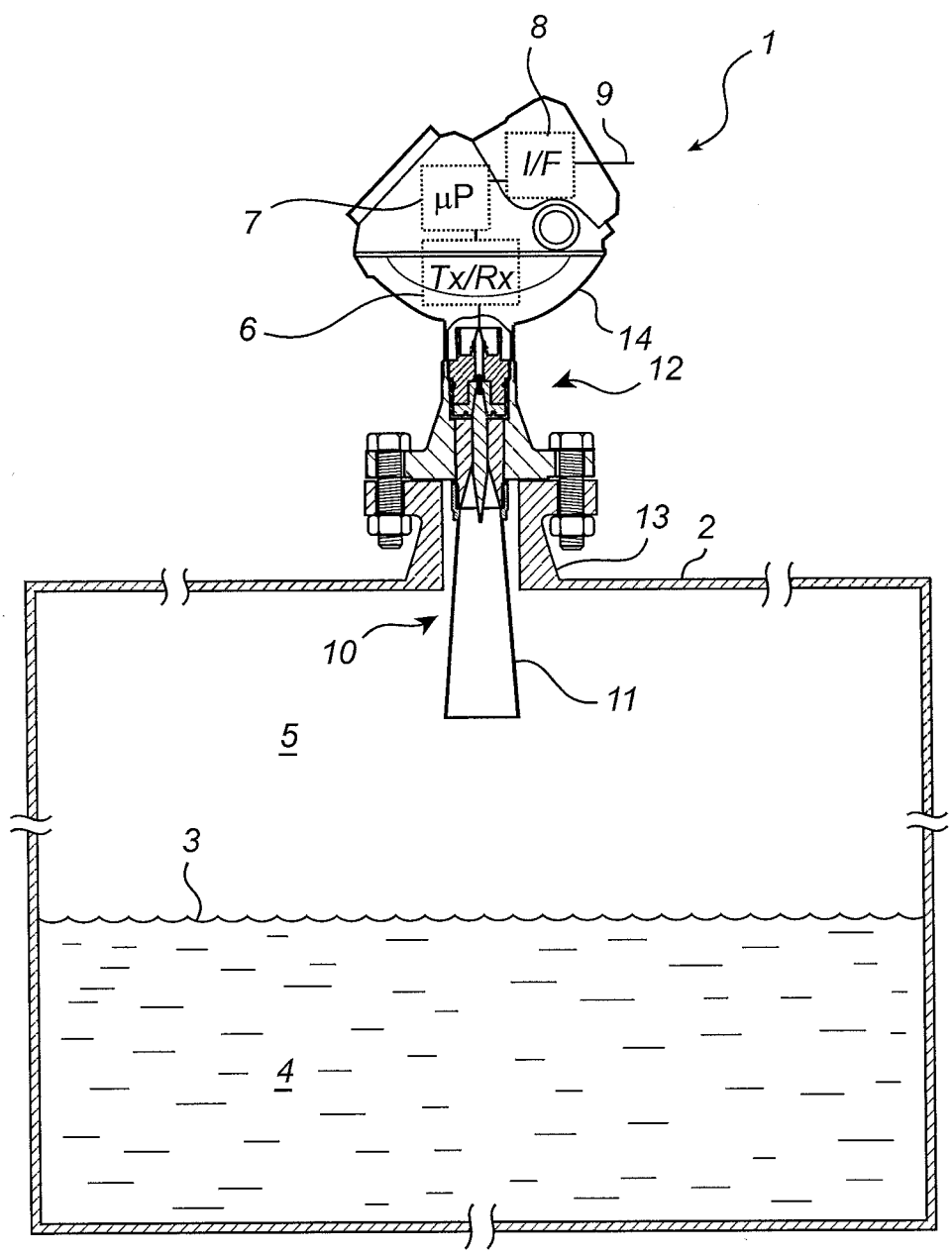
FIG. 1 is a schematic view of a radar level gauge mounted on a tank.

FIG. 1 shows a schematic drawing of a radar level gauge (RLG) 1 according to an embodiment of the present invention. The RLG 1 is mounted on a tank 2, and arranged to perform measurements of a process variable such as the level L of an interface 3 between two materials 4, 5 in the tank 2. Typically, the first material is a liquid 4 stored in the tank, e.g. gasoline, while the second material is air or other atmosphere 5 in the tank. In some applications, the tank is a very large metal tank (diameter in the order of 10 m).

The radar level gauge 1 includes transceiver circuitry 6, processing circuitry 7 and a signal and power interface 8, all enclosed in a housing 14. The transceiver circuitry 6 is electrically connected to a suitable signal propagation device 10, here a directional antenna in the form of an antenna horn 11 extending into the tank 2. The antenna 11 is arranged to act as an adapter, transmitting free propagating electromagnetic waves into the tank 2 to be reflected by the interface, here the surface 3 of the product 4 in the tank 2.

The transmit signal is typically in the GHz range, e.g. around 6 GHz or 26 GHz. It may be a continuous signal with varying frequency (frequency modulated continuous wave, FMCVV), or it can be a modulated pulse. Also other types of transmit signals are possible.

The RLG 1 further comprises a tank feed through structure 12, adapted to provide a preferably pressure sealed passage for electromagnetic signals through the wall of the tank, thereby allowing transmission of transmit signals and return signals between the transceiver circuitry 6 and the antenna 10.

The antenna 10 is mounted to the tank feed through structure 12, on the side facing the interior of the tank. For this purpose, the structure 12 is provided with a threading 15, and the antenna horn 10 is provided with a corresponding threading 16 (see FIG. 2a). On the other side of the structure 12, facing the exterior of the tank, is mounted the housing 14 of the RLG, containing the transceiver 6 and processing circuitry 7. Various mechanical and electrical connections of the housing 14 and its circuitry 6, 7 may be possible, and are not discussed in detail here.

As will be evident from the following description, the feed through structure 12 forms a sealed wave guide passage between the antenna 10 and the circuitry. Signals from the transceiver are fed into the upper end of the waveguide by a suitable feeder (not shown) connected to the transceiver and adapted to couple electromagnetic signals between the transceiver and the hollow wave guide. The signals are then allowed to propagate into the antenna and emitted into the tank. Reflected return signals are received by the antenna and fed into the lower end of the waveguide, and then coupled by the feeder back to the transceiver circuitry.

Figure 2A:
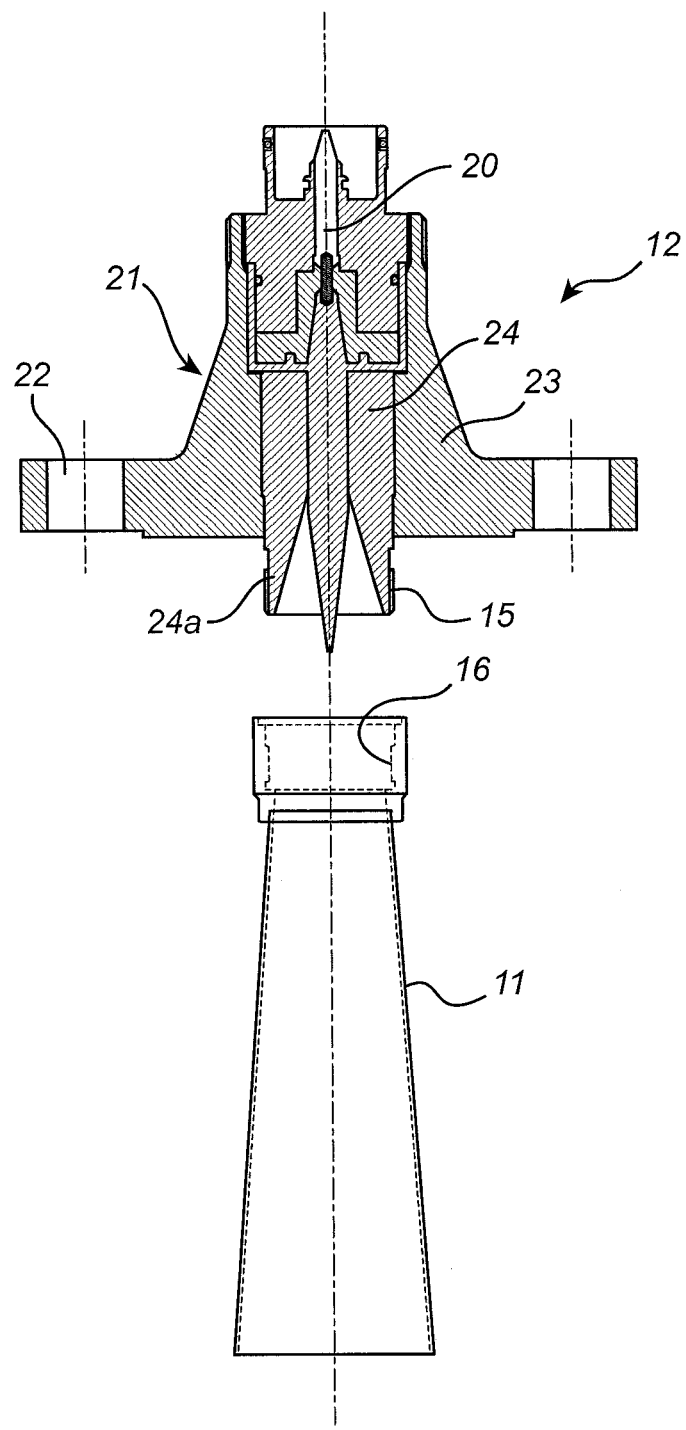
FIG. 2 a-b show a tank feed through structure according to an embodiment of the invention.
Figure 2B:
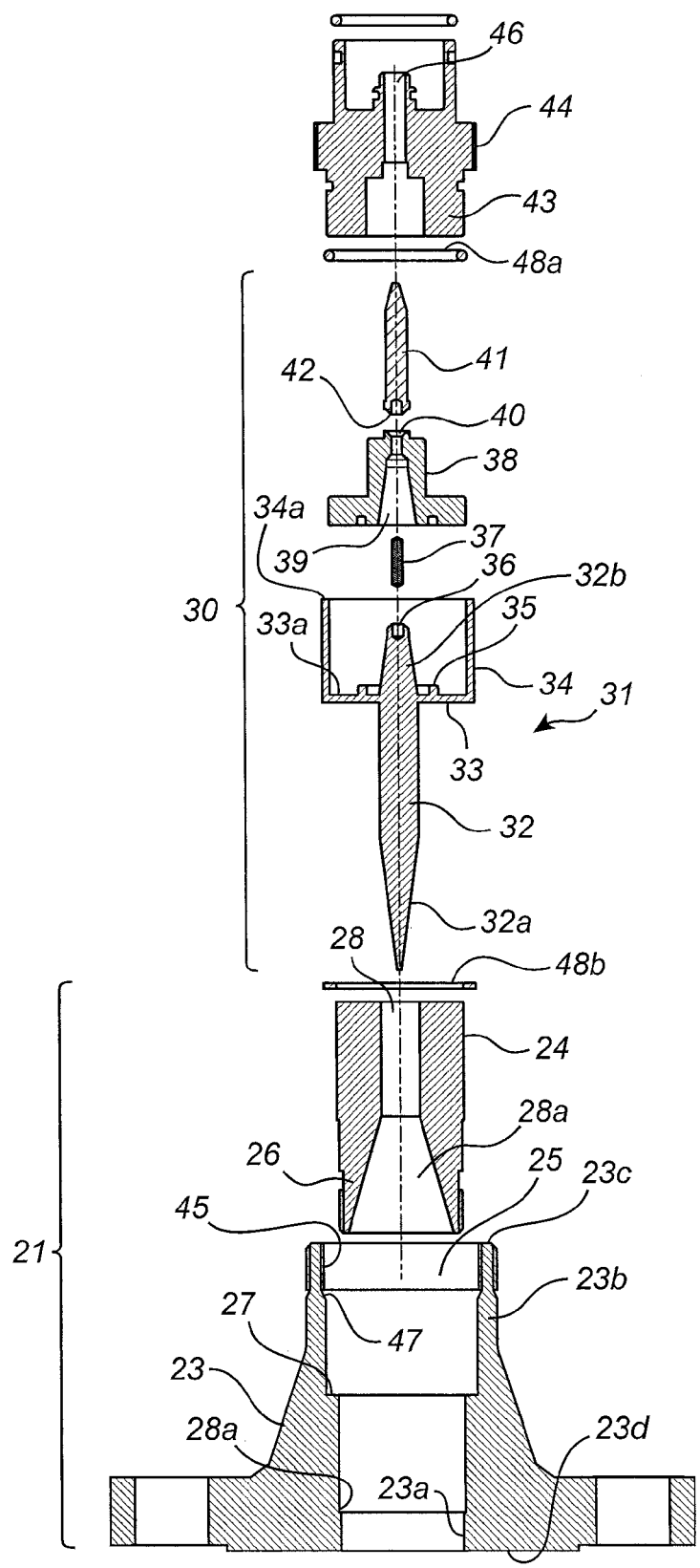

The feed through structure 12 and antenna horn 10 are shown in more detail in FIGS. 2a-2b. In this particular case, the RLG is designed for an operating frequency of around 26 GHz. A wave guide arrangement 30 comprises a hollow wave guide 20 defined by the tank feed through structure, and arranged to guide electromagnetic signals between the circuitry and the antenna 12. The wave guide 20 is here filled with a dielectric material and may have a diameter in the order of 5 mm, but the exact diameter will depend on the dielectric material filing the hollow wave guide.

The feed through structure 12 comprises a tank connection 21 made of a metal material, typically steel, which is adapted to be securely fitted to the tank flange 13 (see FIG. 1). For this purpose the tank connection 21 may have holes 22 for bolts or other fasteners (not shown). Alternatively, it may be adapted to be welded to the tank flange 13.

The tank connection can be formed in one piece. However, in the illustrated case, the tank connection 21 comprises a fixed tank connection 23, which is adapted to be fixed to the tank flange 13, and a tank connection adaptor 24 arranged to be fitted into a central opening 25 of the fixed tank connection 23. The purpose of the adaptor 24 is to allow use of one common fixed tank connection for fitting various coupling arrangements suitable for different signal propagation devices (antennas, wave guiding structures, transmission line probes, etc). The adaptor 24 is suspended by the fixed tank connection 23, here by means of an annular protrusion 26 of the adaptor 24 which rest against an annular abutment 27 in the opening 25. Alternatively, the opening 25 may be conically tapered, and the adaptor then has a matching shape. The adaptor 24 may be press fitted or otherwise secured in the opening 25.

In the illustrated case, the adaptor 24 is suspended in a lower (interior facing) portion 23a of the fixed tank connection, so that an upper (exterior facing) portion 23b of the tank connection 23 extends above the adaptor 24. The adaptor 24 may alternatively be flush with the upper surface 23c of the tank connection structure, or even extend above the surface 23c. Further, in the illustrated example, the lower (interior facing) portion 24a of the adaptor 86 extends beyond the bottom surface 23d of the tank connection 23. The threading 15 is formed on the peripheral surface of this lower portion 24a.

The tank connection 21 acts as a first wave guide forming member, and has a channel 28 that forms an inner portion of the wave guide 20. The bottom portion 28a of the channel is outwardly tapered, i.e. becomes wider closer to the interior of the tank, to provide matching with the antenna horn 11. The wave guide arrangement 30 further comprises a first wave guide filling element 31, arranged to prevent tank content from entering the antenna horn 10. Suitable materials, such as PTFE, are relatively soft especially at elevated temperatures. The member 31 has an elongated center portion 32, a cup-shaped sleeve portion extending radially outwards from the center portion 32 as well as axially along the center portion 32. The sleeve thus forms a cup-shape with an opening facing away from the tank. In the illustrated case, the sleeve is shaped almost like a bucket, and has a disc-shaped portion 33 extending radially out from the center portion, and a cylindrical portion 34 extending upwards from the periphery of the disc-shaped portion 33, along the axis of center portion 32. The cylindrical portion 34 and the center portion 32 are here co-axial.

On the upper surface 33a of the disc-shaped portion 33 there is further formed an annular protrusion 35, formed to act as a quarter wave choke, preventing electromagnetic energy to escape from the wave guide. Such a electromagnetic trap may be obtained by other means, e.g. by suitable dimension of the radial distance between the center portion 32 and the cylindrical portion 34.

The center portion 32 has a tapered lower end 32a which extends into the tapered portion 28a of the channel 28. The upper end 32b of the center portion 32 is also slightly tapered, and has in its end an indentation 36 for receiving a second dielectric filling member, here in the shape of a pin 37.

The pin is made of a structurally strong and temperature resistant material. The pin should withstand temperatures at least up to 250 degrees Celsius, and preferably as high as 500 degrees Celsius. Examples of suitable materials are resin, glass and aluminum oxide.

The pin 37 is held in place by an intermediate metal element 38, adapted to fit in the interior of the bucket, and having an inner space 39 formed to receive the upper end 32b of the center portion 32. The metal element 38 has an opening 40 through which the pin 37 extends, which opening thus forms a short section of the wave guide 20. A further wave guide dielectric filling element 41 is arranged on the metal element 98, and has in its lower end an indentation 42 adapted to receive the pin 37.

The pin 37 is held in place so as to be fixed at least in an axial direction away from the tank. For example, the pin 37 may be unattached, but abut against an abutment in the metal element 38 above the pin 37. Alternatively, the pin 37 is attached to the metal element 38. For example, if the pin 37 is made of aluminum oxide, it may be brazed to the element 38.

The pin 37 serves to prevent that a relatively soft dielectric wave guide filling element 31 is pushed out of the channel 28 by the pressure inside the tank, in particular during conditions of elevated temperatures. With this design, a feed through structure designed for 26 GHz with a wave guide filling of PTFE closest to the antenna, can withstand pressures of up to 40 bar in temperatures of up to 250 degrees Celsius.

The tank feed through structure 12 further comprises a metal fastening member 43, with a bore 46, adapted to surround the second wave guide filling element 41, to form the outer part of the wave guide 20. The fastening member 43 is arranged to be secured to the tank connection 21 such that the coupling arrangement 30 comprising the wave guide filling elements 31 and 41, as well as the pin 37 and metal element 38, is sandwiched between the tank connection 21 and the fastening member 43. In the illustrated case, the fastening member 43 has an outer threading 44, corresponding to a threading 45 on the inside of the upper portion 23b of the fixed tank connection 23, so that the fastening member 43 can be securely threaded in place.

It is noted that the metal element 38 and the fastening member 43 may be integrated in one outer wave guide forming member.

The feed through structure also includes a process seal, i.e. a seal preventing tank atmosphere potentially including product in gas form from leaving the tank. This may, for example, be accomplished by a plurality of sealing elements included in the coupling arrangement.

During conditions of elevated temperatures, potential variations in diameter of the PTFE filling member make sealing difficult. For this purpose, the filling member has the cup-shaped sleeve described above, and a sealing element such as an o-ring 48a is provided between the inside of the cylindrical portion 34 and the fastening member 43. The material thickness of the portion 34 is much smaller than the diameter of the member 31, thus leading to smaller potential heat expansion. A further sealing element, here a flat ring 48b, is provided between the upper annular abutment 28b of tank connection 23 and the peripheral part of the disc shaped portion 33. Again, the disc portion 33 has a material thickness significantly smaller than the diameter of the member 31. As an example, the thickness of the material in places of the cup-shaped sleeve that are in contact with the sealing elements 48a, 48b, is less than 5 mm, and preferably around 2 mm.

The outer rim 34a of the cup-shaped sleeve (here of cylindrical portion 34) is located a short distance below the threaded portion 45, and one or several channels 47 are formed in the tank connection 21 and/or the fastening member 43 to thereby provide a fluid connection between the outer rim 34a and the exterior of the tank. Any leakage or condensation, that has passed the sealing element 48b, will therefore be guided by the outer surface of the cup-shaped sleeve, and exit the tank feed through structure through the channels 47. Such leakage or condensation is thus prevented from penetrating the sealing element 48a.

The person skilled in the art realizes that the present invention by no means is limited to the preferred embodiments described above. On the contrary, many modifications and variations are possible within the scope of the appended claims. For example, the sleeve portion does not necessarily have a flat portion and a cylindrical portion, but may have the shape of a rounded cup. It may also be a funnel-shape, e.g. comprising a conical surface with its base facing out of the tank.

What is claimed is:

1. A radar level gauge using electromagnetic waves for determining a filling level of a product in a tank, said radar level gauge comprising:
   a transceiver for transmitting an electromagnetic transmit signal and receiving an electromagnetic echo signal;
   processing circuitry connected to said transceiver for determining said filling level based on said electromagnetic echo signal;
   a signal propagating device adapted to direct said electromagnetic transmit signal towards a surface of said product and to return a reflection from said surface as said electromagnetic echo signal, and
   a wave guide arrangement, connecting said transceiver with said signal propagation device, said wave guide arrangement including
      a hollow wave guide, comprising an inner portion formed by a first electrically conducting wave guide forming member, and an outer portion formed by a second electrically conducting wave guide forming member, and
      a first dielectric wave guide filling member having an elongated center portion with an inner end oriented towards the inner wave guide portion and an outer end oriented towards the outer wave guide portion, and a cup-shaped sleeve portion having a radial portion extending from said center portion and an axial portion extending from said radial portion, wherein said radial portion is located between said first and second wave guide forming members,
      a second dielectric wave guide filling member, which second filling member is arranged inside the hollow wave guide outside said first filling member with respect to said tank, wherein said second filling member is fixed in said wave guide at least in a direction out from said tank,
      wherein said second dielectric wave guide filling member is configured to withstand 250 degrees Celsius.

2. The radar level gauge according to claim 1, wherein said second wave guide filling member is configured to withstand 500 degrees Celsius.

3. The radar level gauge according to claim 1, wherein said second wave guide filling member is made of a dielectric material selected from the group of ceramics, epoxy resin, glass and aluminum oxide.

4. The radar level gauge according to claim 1, wherein said first wave guide filling member is made of a dielectric material selected from the group of PTFE (polytetrafluoroethylene), PFA (perfluoroalkoxy), FEP (fluorinated ethylene propylene) and PPS (polyphenylene sulfide).

5. The radar level gauge according to claim 1, wherein said second wave guide filling member is arranged in said outer portion.

6. The radar level gauge according to claim 5, wherein said wave guide arrangement further comprises a first sealing element between said first wave guide filling member and said first wave guide forming member, thereby providing a process seal of said tank.

7. The radar level gauge according to claim 6, wherein said wave guide arrangement further comprises a second sealing element between said first wave guide filling member and said second electrically conducting wave guide forming member.

8. The radar level gauge according to claim 1, wherein said axial portion extends axially from the radial portion in a direction out from the tank, such that said cup-shaped sleeve portion has an opening facing away from said tank.

9. The radar level gauge according to claim 1, wherein said wave guide arrangement further comprises at least one channel providing fluid contact between an outer rim of said cup-shaped sleeve portion to an exterior of said tank.

10. The radar level gauge according to claim 1, further comprising at least one sealing element in contact with said cup-shaped sleeve potion and adapted to provide a process seal of said tank, wherein walls of said sleeve portion, at least in places where said at least one sealing element is in contact with said sleeve portion, have a material thickness significantly smaller than the diameter of said center portion.

11. The radar level gauge according to claim 10, wherein said material thickness is less than 5 mm.

12. The radar level gauge according to claim 1, wherein said sleeve portion comprises an essentially cylindrical wall portion coaxial with the center portion, and a flat disc portion bridging a distance between the center portion and the wall portion.

13. The radar level gauge according to claim 12, wherein said disc portion extends essentially in a plane normal to a longitudinal axis of said hollow wave guide.

14. The radar level gauge according to claim 13, wherein a surface of said disc portion is provided with at least one annular protrusion, concentric with said longitudinal axis, said annular protrusion being formed to act as a quarter wave choke to prevent electromagnetic energy from escaping from said wave guide.

15. The radar level gauge according to claim 1, further comprising a tank connection arranged to be secured to the tank, said tank connection forming at least a portion of said wave guide.

16. The radar level gauge according to claim 1, wherein said signal propagating device comprises a directional antenna mounted to said tank connection.

17. The radar level gauge according to claim 1, wherein the axial portion of the first dielectric wave guide filling member is located outside said hollow wave guide.

18. A radar level gauge using electromagnetic waves for determining a filling level of a product in a tank, said radar level gauge comprising:
   a transceiver for transmitting an electromagnetic transmit signal and receiving an electromagnetic echo signal;
   processing circuitry connected to said transceiver for determining said filling level based on said electromagnetic echo signal;
   a signal propagating device adapted to direct said electromagnetic transmit signal towards a surface of said product and to return a reflection from said surface as said electromagnetic echo signal, and
   a wave guide arrangement, connecting said transceiver with said signal propagation device, said wave guide arrangement including
      a hollow wave guide, comprising an inner portion formed by a first electrically conducting wave guide forming member, and an outer portion formed by a second electrically conducting wave guide forming member, and
      a first dielectric wave guide filling member, having an elongated center portion with an inner end received in the inner wave guide portion and an outer end received in the outer wave guide portion, and a cup-shaped sleeve portion extending radially outwards from said center portion and axially along said center portion, said sleeve thus forming a cup-shape with an opening facing away from said tank, at least part of said sleeve portion being sandwiched between said first and second wave guide forming members.

19. The radar level gauge according to claim 18, wherein said wave guide arrangement further comprising at least one channel providing fluid contact between an outer rim of said cup-shaped sleeve to an exterior of said tank.

20. The radar level gauge according to claim 18, wherein said wave guide arrangement further comprises at least one sealing element in contact with said cup-shaped sleeve and adapted to provide a process seal of said tank, wherein walls of said sleeve, at least in places where said at least one sealing element is in contact with said sleeve, have a material thickness smaller than the diameter of said center portion.

21. The radar level gauge according to claim 20, wherein said material thickness is less than 5 mm.

22. The radar level gauge according to claim 20, wherein said wave guide arrangement comprises a first sealing element between said first filling member and said first wave guide forming member.

23. The radar level gauge according to claim 20, wherein said wave guide arrangement further comprises a second sealing element between said first filling member and said second wave guide forming member.

24. The radar level gauge according to claim 18, wherein said sleeve comprises an essentially cylindrical wall portion coaxially surrounding the center portion, and a flat disc portion bridging a distance between the center portion and the wall portion.

25. The radar level gauge according to claim 24, wherein said disc portion extends essentially in a plane normal to a longitudinal axis of said hollow wave guide.

26. The radar level gauge according to claim 25, wherein a surface of said disc portion is provided with at least one annular protrusion, concentric with said longitudinal axis, said annular protrusion being formed to act as a quarter wave choke to prevent electromagnetic energy from escaping from said wave guide.

27. The radar level gauge according to claim 18, wherein the first filling member is made of a first dielectric material, and wherein said wave guide arrangement further comprises a second filling member made of a second dielectric material, which second filling member is arranged in said outer wave guide portion so as to be fixed in said wave guide at least in a direction out from said tank, and wherein said second dielectric material is configured to withstand temperatures up to 250 degrees Celsius.

28. The radar level gauge according to claim 27, wherein said second dielectric material is configured to withstand temperatures up to 500 degrees Celsius.

29. The radar level gauge according to claim 27, wherein said second dielectric material is selected from the group of ceramics, epoxy resin, glass and aluminum oxide.

30. The radar level gauge according to claim 18, wherein said first dielectric filling member is made of a material selected from the group of PTFE (polytetrafluoroethylene), PFA (perfluoroalkoxy), FEP (fluorinated ethylene propylene) and PPS (polyphenylene sulfide).

31. The radar level gauge according to claim 18, further comprising a tank connection arranged to be secured to the tank, said tank connection forming at least a portion of said wave guide.

32. The radar level gauge according to claim 31, wherein said propagating device comprises a directional antenna mounted to said tank connection.

33. A method for assembling a wave guide arrangement for a radar level gauge, said method comprising the consecutive steps of:
arranging a first electrically conducting wave guide forming member in an opening of a tank connection adapted to be secured to a tank, said first electrically conducting wave guide forming member forming an inner wave guide portion,
arranging a first dielectric wave guide filling member inside the first electrically conducting wave guide forming member,
arranging a second electrically conducting wave guide forming member on top of the first electrically conducting wave guide forming member, said second electrically conducting wave guide forming member forming an outer wave guide portion,
wherein said first dielectric wave guide filling member has an elongated center portion with an inner end oriented towards the inner wave guide portion and an outer end oriented towards the outer wave guide portion, and a cup-shaped sleeve portion having a radial extension from said center portion and an axial extension from said radial extension, said radial extension being located between said first and second wave guide forming members.

34. The method according to claim 33, further comprising arranging a second dielectric wave guide filling member inside the first electrically conducting wave guide forming member, before the second electrically conducting wave guide forming member is arranged on top of the first electrically conducting wave guide forming member.

35. The method according to claim 33, further comprising arranging a first sealing element between said first wave guide filling member and said first wave guide forming member, thereby providing a process seal of said tank.

36. The method according to claim 33, further comprising arranging a second sealing element between said first filling member and said second wave guide forming member.

* * * * *

UNITED STATES PATENT AND TRADEMARK OFFICE
CERTIFICATE OF CORRECTION

PATENT NO. : 9,212,941 B2
APPLICATION NO. : 13/795944
DATED : December 15, 2015
INVENTOR(S) : Hakan Fredriksson and Magnus Ohlsson It is certified that error appears in the above-identified patent and that said Letters Patent is hereby corrected as shown below:

On the title page

Item 73 Assignee: Delete "Gothenburg (SE)" and insert --Goteborg (SE)--

In the claims

Claim 10: column 8, line 7, delete "potion" and insert --portion--

Claim 19: column 9, line 2, delete "comprising" and insert --comprises--

Signed and Sealed this
Seventh Day of June, 2016

Michelle K. Lee
*Director of the United States Patent and Trademark Office*